United States Patent [19]

Rees et al.

[11] 4,251,684

[45] Feb. 17, 1981

[54] DATA STORAGE SYSTEMS

[75] Inventors: Frederick H. Rees, London; Dan Bleicher, New Barnet, both of England

[73] Assignee: Standard Telephones and Cables Limited, London, England

[21] Appl. No.: 959,793

[22] Filed: Nov. 13, 1978

[51] Int. Cl.³ .......................... G06F 3/00; H04L 15/04
[52] U.S. Cl. .................................. 178/3; 340/147 LP
[58] Field of Search .............................. 178/3, 17.5; 340/147 LP; 179/15 A

[56] References Cited

U.S. PATENT DOCUMENTS

| | | | |
|---|---|---|---|
| 3,469,021 | 9/1969 | Dahlblom et al. ...................... | 178/3 |
| 3,786,435 | 1/1974 | Sherman ............................ | 179/15 A |
| 3,787,820 | 1/1974 | Sherman ............................ | 179/15 A |

Primary Examiner—Thomas A. Robinson
Attorney, Agent, or Firm—James B. Raden; Donald J. Lenkszus

[57] ABSTRACT

Queuing of interexchange messages in a multi-exchange digital telecommunication network is provided using a dynamic store into cells of which the messages are placed. A subsidiary control store has a cell for each cell of the message store and each of these cells contains a control word which contains the status-busy/free of its message cell, plus details of the message including the user for which it is stored when the cell is busy. These details include message priorities, so that queues of messages awaiting attention can be assembled in the store.

6 Claims, 3 Drawing Figures

DATA STORAGE SYSTEMS

BACKGROUND OF THE INVENTION

This invention relates to a data storage system which serves a number of user circuits each of which provides one of the ports to the system and over which messages may be received either for transmission or retransmission, or for temporary storage, or for processing at the user circuits.

Each such message includes signalling information and address information, and the system is applicable to, but by no means restricted to, a message transmission system included in a digital telecommunication system having many system nodes, which in one example of such a system are telephone exchanges or system administration centres.

SUMMARY OF THE INVENTION

An object of the invention is to provide a data storage system suitable for use in such systems or in other systems where large quantities of data have to be handled and in which queuing facilities are needed.

According to the present invention, there is provided a data storage system which includes a number of ports each associated with a user circuit of the system, messages being received and/or sent via said ports, a message store having a number of message cells in each of which one of said messages can be stored, a control store having a number of control cells each associated with one of said message cells and each containing stored information indicating whether its said message cell is in use and the identity of the user port concerned if its message cell is in use, scanning means which scans the control cells sequentially and, when one of said user circuits has a message to be stored, selects a free message cell for that message, and control means responsive to said detection which routes a said message for which storage is required into a free message cell, the contents of the control cell associated with the message cell into which a message has been routed being amended to indicate that that message cell is in use and to indicate the identity of the user port for which the message cell is in use.

BRIEF DESCRIPTION OF THE DRAWING

An embodiment of the invention will now be described with reference to the accompanying drawing wherein.

DETAILED DESCRIPTION OF THE DRAWING

Figure 1:
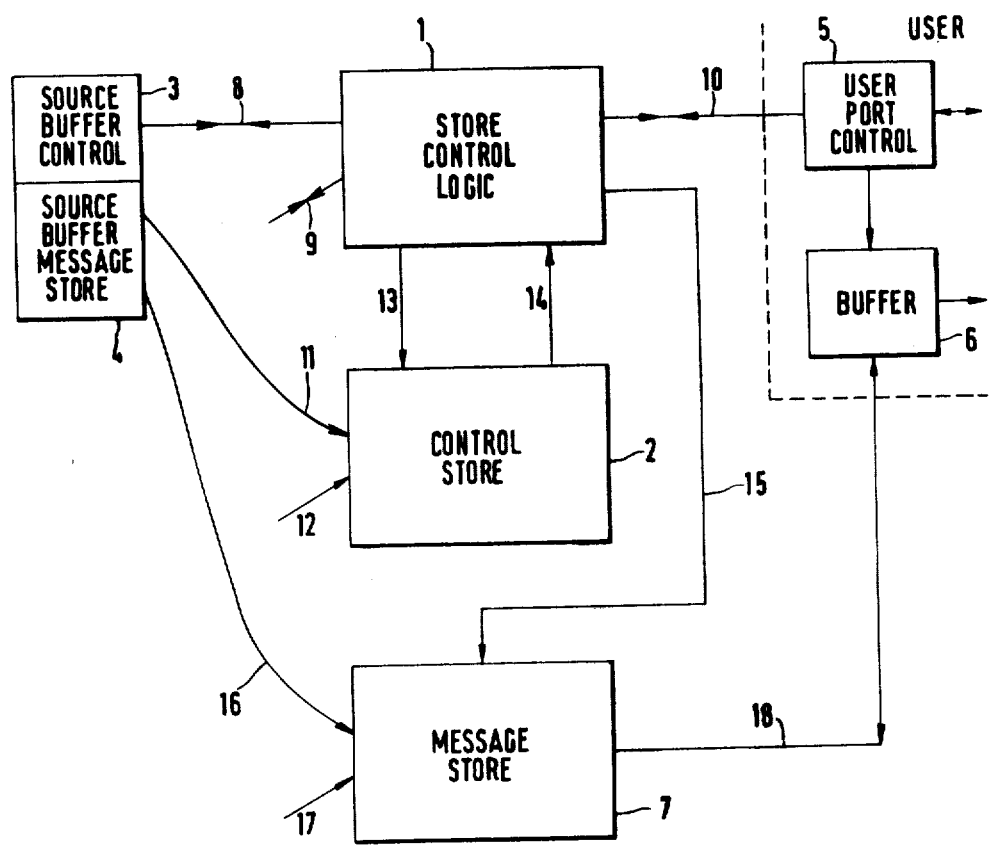
FIG. 1 illustrates a data storage system in block diagram form.

The present invention is of wide application, as indicated above, and is thus a general system tool, but it is described herein as applied to a message transmission system forming part of a multi-exchange digital telecommunication network. The system under discussion is used to transfer messages conveying call processing and other information between nodes of the telecommunication network, and has a number of so-called user ports each of which is a signal channel serving a number of message-conveying links in common channel manner. Each message contains information which identifies the call or other operation to which it relates, this including destination information. In the present arrangement, the sources, i.e., input ports, are used to enter messages into the message store from the system processors.

Each input port has its own buffer storage into which an incoming message is placed until it can be transferred to one of the storage system's message cells. Each message which is entered into the storage system occupies part or all of a message cell and only one message may be present in a message cell at any one time. All message cells are identical, and each of them consists of a number of sub-sections each capable of storing a single message element. Each such message element is a multi-bit combination which in the present case consists of 48 bits of message information. As will be seen later, 32 bits of "housekeeping" information may be added by the user circuit for transmission therefrom. A message may consist of a minimum of one element, the maximum number of elements depending on the data to be dealt with. The message cell in the present case can accommodate the maximum number of elements in the type of message to be catered for. Alternatively, if the majority of the messages to be dealt with are short, with a few long messages, each of the latter can be split into two or more "sub-messages" which are handled separately.

As stated above, the system also has a control store which includes a number of store elements each associated with one of the message cells. Each such control store cell contains data relating to its message cell, and in operation of the system these control cells are scanned sequentially. When a control cell is scanned its contents indicate whether it is available for use, in which case its contents, known as a control word, indicates that the cell is free. In the present case the free indication is an all-zeroes word. If the control word indicates that its memory cell is in use, it includes a busy status code plus the identity of the destination user port for which it is in use. When such a message store is in use, the message therein may be a message for any of the user ports, any one or more of which may have a queue of messages awaiting attention—this follows from the fact that these control channels are used for common signalling.

Thus the message in a message cell may be a message in any of the input or other queues associated with that user port, or may be stored for other temporary purposes by that user. In the application of the data storage system described herein, a single message store—a dynamic store—provides three input queues for each of 124 signalling terminals, and serves, after a message has been accepted from a source (e.g. from a processor), to retain that message in normal operation until such time as the signalling terminal has received information from a distant receiver indicating that the message has been received correctly. The user port has access to the stored message every time the message polls the user as a result of the message being scanned, so message elements can be extracted for transmission or retransmission, as required by the user.

The accompanying FIG. 1 indicates schematically the operation of the data storage system, its main parts being the store control logic 1, the control store 2 and the message store 7. The control store 2 includes addressing circuits of a type well-known in the art for accessing all of its word locations and means for amending the words stored in those locations. As is explained in greater detail hereinbelow, a control word's message status bits may be amended if the message to which it corresponds can not be received by a first choice user; but must be passed to a second choice user. The message store 7 includes addressing circuits, read and write circuits and circuits for amending word locations. These messsage store circuits are also of conventional types. The Store Control Logic 1 controls data transfers, memory reading and writing, and amendments to message and control word headers. The Store Control Logic 1 also controls the insertion and manipulation of the "housekeeping" portions of messages. Associated with these are, for a source terminal served, a source buffer control unit 3 plus source buffer message store 4, and for signalling terminals a user port control 5 plus buffer 6. Terminals may have units 3 and 4 as well as units 5 and 6, but terminals may also have 3 and 4 or 5 and 6 only. In the system described herein, units 3 and 4 at a single port are associated with the input of messages from a processor, while units 5 and 6 are associated with outputs to signalling links (124 ports). In other systems, a user may have both an input port, units 3 and 4, and an output port, units 5 and 6. As the connections indicate the terminals have access to the three main parts of the system.

The store control logic 1 has both-way communication for control purposes with the source buffer control 3 section of a number of message-sources, as indicated at 8,9. It also has both way access for control purposes, via connections such as 10 to at least one user port control 5.

The control store 2 is accessible from the source buffer message stores via connections such as 11, 12, and is also accessible via the connection 13, with access in the reverse direction via connection 14. The store control logic 1 has access for address read-write control via connection 15 to the message store, which is also accessible via connections such as 16, 17 from message sources. In addition it has access via connections such as 18 to one or more user buffer. Note that many of these connections would in fact be multi-wire connections.

The purpose of the control connections are summarised as follows:

- 8,9 Control "handshake" with source/buffer 3/4
- 10 Control "handshake" with user port control 5
- 11, 12 Message header control information written in the control element of a message
- 13 Address, read-write, control information for modification of control element
- 14 Control element of message
- 15 Address read-write control.

As used in a telephone switching network, the cells of the control store 2 may have accommodation for a second user identity. This identifies a user to which the message for that control cell's control word is to be routed should the normal user be unsuitable for accepting the message. If the first choice user is unable to process the message, that message is then transferred by operation of the logic 1 to an input for an input queue appropriate to the second choice user. This transfer involves manipulation of the status bits of the control word used.

A corresponding set of states exists for processing the message by the second choice user as exists for processing it by the first choice user. In the present example the message numbers assigned to all messages of the same priority intended for either the first or the second choice user are generated by the same message number. This is so that the first-in-first-out (FIFO) mode of operation may be preserved as regards the input queues, there being one input queue per user per priority level in normal operation.

Usually, as already indicated, messages may be of variable length, in which case the length of the message in number of message elements is recorded in the associated control store element when the message is transferred from the source to the store.

At this point the structure of a control word will be explained. This contains in a first portion the first choice user number, the second choice user number, the message priority, the message number and the message length. These items of information are derived via the connection such as 11 or 12 from the message header. A second portion of the control word contains message status in information and time out information, supplied by the control store 2, and the user sequence number and such other user information as is needed, these being supplied by the user. More specifically, the 48 bit control word is arranged as follows:

(a) Bits 1 to 7—First choice user number;
(b) Bits 8 to 14—Second choice user number;
(c) Bits 15 to 16-Priority bits;
(d) Bits 17 to 23—Message number (7bit cyclic number);
(e) Bits 24 to 26—Message length;
(f) Bits 27 to 28—Message status;
(g) Bits 29 to 33—Time Out;
(h) Bits 34 to 38—User sequence number; and
(i) Bits 39 to 48—Other data from user.

Items (a) to (e) above are in the message header, items (f) and (g) are supplied by the control store, and items (h) and (i) come from the user.

The message status bits of a control word in the store 2 are set to the "message inserted" states when a message is inserted into the message store 7. The input queue which now contains the inserted message is defined by the first choice user code and the priority code allotted to that message, as indicated by the appropriate bits of the message's control word. That is, for each user circuit is number of queues is set up, one per priority level, each of which contains all messages in the message store for that user and for one of the priority levels. In general the messages in each of these queues are dealt with in chronological order, i.e. on a FIFO basis.

Figure 2:
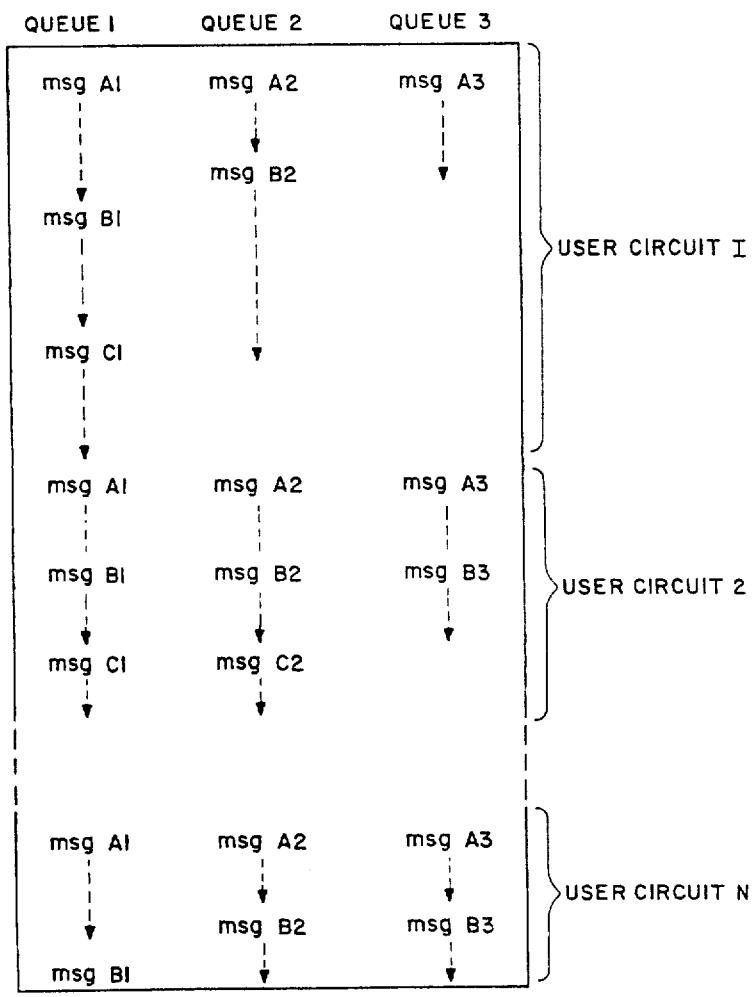
FIG. 2 illustrates a memory map of the message store of FIG. 1.

FIG. 2 illustrates a memory map in accordance with the above description where three queues (and correspondingly three priority levels) are shown. As can be seen, each user circuit I to N has three queues designated 1, 2 and 3. In each queue, e.g., A, a number of messages, e.g., A1, B1, C1, are stored for that user circuit. As explained above, all messages, e.g., A1, B1, C1, in queue, e.g., A, are of the same priority level. Assuming the messages for queue 1 for user I were entered into the memory in the order A1, B1, C1, then the messages will be read out in the order A1, B1 and C1.

When a message is accepted for processing by a user, it is removed from one input queue, and transferred functionally to a functional sub-store of the user. However the message remains physically in the same message cell. To do this the status bits of the control word (supplied by the control store) are altered, and in addition in the present system a user addressing reference is provided. This is the user sequence number mentioned above, which comes from the user, and specifies the first message element in the message as assigned by the user.

When a message control cell, i.e. one of the cells of the store 2, has any other status than idle, it effectively belongs to the first choice user, unless as a result of a prior decision that message has been transferred from control by the first choice user to control by the second choice user, with the appropriate change in the status bits. In this latter case the message control cell effectively belongs to the second choice user.

Figure 3:
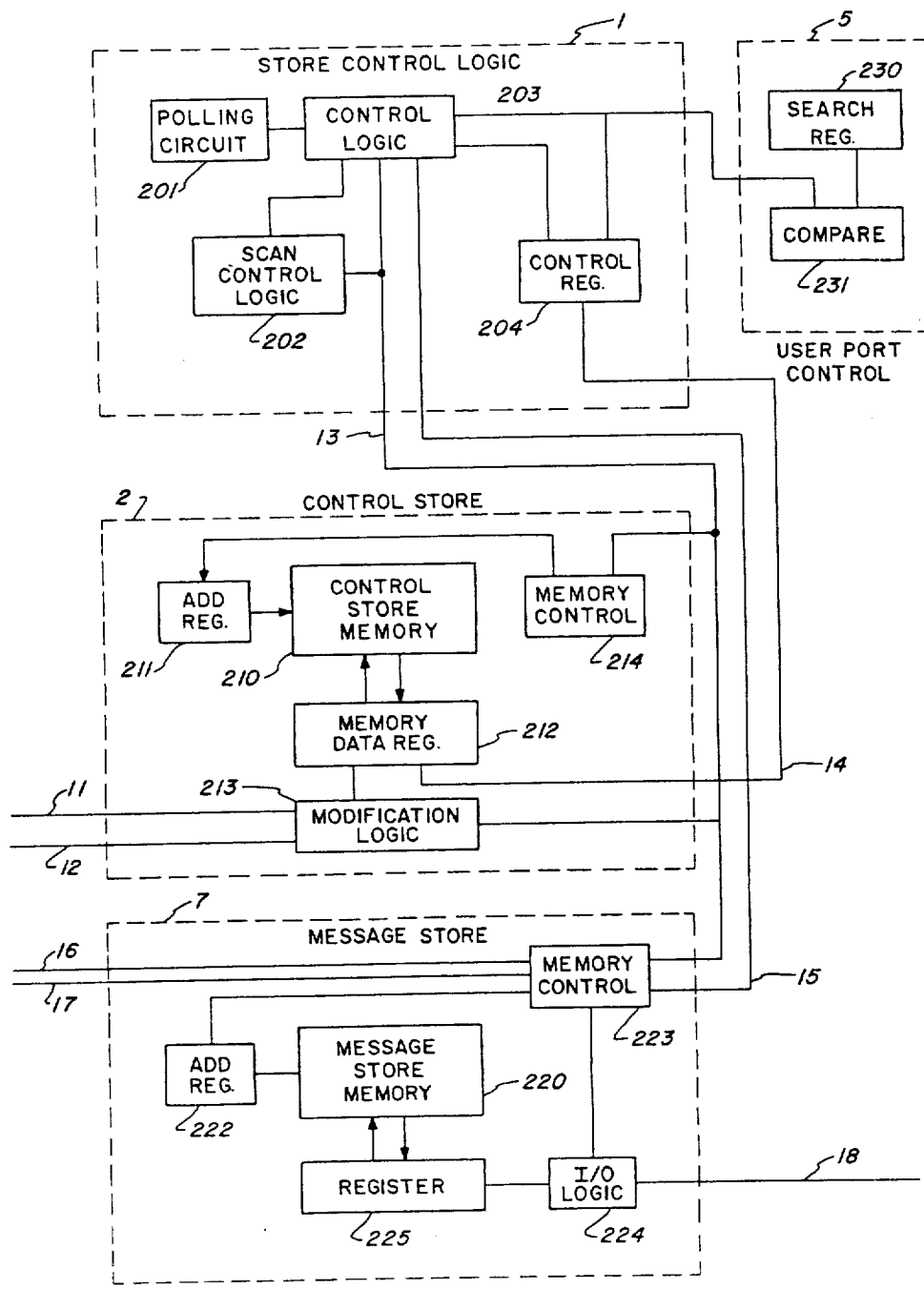
FIG. 3 illustrates portions of FIG. 1 in greater detail.

FIG. 3 illustrates portions of FIG. 1 in greater detail. Like reference numerals are used to designate like elements in the Figures. It should be pointed out that the details shown in FIG. 3 are merely illustrative of the logic circuits which may be easily provided by one skilled in the art based upon the functional operations which are described herein. The store control logic 1 includes a polling circuit 201 which polls the input port or ports to determine if there is a message awaiting insertion into the dynamic message store 7. Scanning control logic 202 is provided for cyclically scanning the control words stored in the control store 2. A control register 204 is coupled to the output of the control store 2 and transfers control word information to the user port under control of the control logic 203. The control logic 203 provides the necessary control features for scanning, polling and information transfer.

The Control store 2 comprises a control store memory 210 of a type well-known in the art and associated memory circuits also of conventional, well-known design. More specifically, the control store includes a memory address register 211, memory data register 212, modification logic 213 for modifying the contents of a memory word, and memory control logic 214 for selecting memory read or write operations, and memory addresses under control of control logic 203.

The message store 7 likewise includes a message store memory 220, a memory data register 221, memory address register 222, memory control 223 similar to memory control 214 and input/output gating logic 224.

Additionally, the user port control 5 includes a search register 230 and a comparison circuit 231.

We now consider the operation of the dynamic store in more detail. This operation is based on the cyclic scanning under control of scan control logic 202 at a suitably rapid rate of the control words in the store 2, each of which is associated with one of the message cells in the store 7. The scan control logic 202 causes the control store memory 210 to be sequentially addressed via memory control 214 and address register 211. As each word location is addressed, its contents are transferred to data register 212, then transferred to control register 204 and tested for busy or idle status by control logic 203. When this scan finds a control cell whose contents indicate that the associated cell of the store 7 is idle, the input port or ports is or are polled by polling circuit 201 to see if there is a message awaiting insertion into the dynamic store 7. If such a message is found, the store control logic (which, of course, includes the control store scanner 202 and the polling circuitry 201) controls the transfer of control "information" to the control store cell found to be idle and the transfer of the message to the associated cell of the memory store 7. The status of the control store cell is specified as "message inserted" before the scan is restarted for the logic to test the next control store cell.

If the next control store cell which is scanned is found not to be idle, the operational user code, which is the first or second choice user code as specified by the status bits, is used to address the user port identified by that user code. A "handshake" control can now take place between the control store logic 1 and the user port control such as 5. This causes the control word to be modified by control logic 203 and modification logic 213 as and then required, and information to be transferred from the message cell to that user's buffer such as 6 when this is required by the user. This, of course, takes place at a time defined by the scanning circuit 202.

When a message first enters the dynamic store its control word is put into the "message inserted" state assigned to one of the user's input queues, the choice of queue depending on the priority of the message. The control store cell associated with that message is scanned at the scan rate of scan control logic 202, and it may occur that when it is first scanned after it has assumed the "message inserted" state, the first choice user is found to be unsuitable for servicing the message. If this is so, the message may be re-assigned for servicing by the second choice user by changing the status bits to specify "message inserted, for second choice user." Thus when the first choice is found to be unavailable, the message is sent out using the second choice user.

During normal operation a busy control store cell and its controls when scanned cause the user port 5 to be supplied with (a) the phase (e.g. stage of message transfer obtained), (b) the message number, and (c) the input queue identity defined by the priority number. As already mentioned when a control word is found to be busy, the user for which the appropriate message is intended is polled on each scan on which that word is busy, and that user is required to accept messages according to the message priority, with each priority queue dealt with on a FIFO basis. To implement this the user port control includes a search register 230 which determines the next message to be serviced by the user, by the use of the message number and the priority number.

When a control store cell in the "message inserted" state is scanned, the logic causes the user port concerned to be supplied, via connections 14 and 10, with the message number, the priority and an indication that the control word is in the "message inserted" state. At the user port control 5, a comparison circuit 231 makes a comparison between the message number and priority details recorded in the search register and the corresponding details as supplied to the user port on each such access due to a control cell in the "message inserted" state. If the comparison determines that either:
  (a) the polling message in the message store has a higher priority than the message whose details are recorded in the search register, or
  (b) the polling message has the same priority as the message whose details are in the search register 230 but whose message number indicates that it entered the message store earlier than did the one whose details are in the search register 230,
then the search register is over-written so that it now contains the details of the polling message.

If the details of the polling message are found to be identical with the details in the user's search register 230, then a complete scan of the control store has been carried out during which there has been found no message for that user which is of higher priority than the one whose details are in the search register.

If the user is ready to accept a message from its input queues, the user port's control 5 causes the status of the message as indicated on its control word to be changed by a "handshake" control between the store control logic 1 and the control 5. This removes the message from the user's input queue—because it is about to be dealt with—while retaining it in the same message store cell. At the same time as these operations occur, the search register 230 is reset, and any message information which the user needs is transferred from the message store 7 to the user port. The data transfer is effected without deletion from the message store. Note that this transfer may, in other applications of systems such as described herein, if desired be effected with deletion. As the user is now in control of this message, it may at this scan time or at a subsequent scan time insert into the control store cell a label which enables the user to identify the message element concerned.

As mentioned earlier, the messages contain 48-bit elements for the message information: when a message is to be sent from a user terminal, each of its elements has 32 bits of "housekeeping" information added to it. This includes, inter alia, sequence numbers and error detection information. These 32 bit housekeeping portions are generated locally in the multiterminal user ports, each with 31 users. The generation uses time divided logic. If a message element is retransmitted all but 7 of its 32 housekeeping bits may differ from what was previously sent. The unchanged bits refer to the message's former sequence number, and in this case it is the function of the user port's store to separate such bits from the message elements for message housekeeping. These 32 bits of signalling unit housekeeping are not passed on to the actual message user at the far end of the signalling link.

When the search register 230 is reset as described above, it is available for determining the next message, if one is available, which should be assigned for processing by that user.

In the system described herein, the user is assumed to be a signalling terminal from which messages are sent to remote locations (assumed to be telephone exchanges or administration centres). When a message is assigned to be transmitted by such a terminal the first of the message elements is given a sequence number in the numbering scheme of the user terminal. If this number is n the second element of the message is (n+1), a cyclic code of seven bits being used. Thus when a control store word which is not in the idle condition is scanned, it can, by virtue of the control store logic—user port control interconnection cause the supply of any requested one of the message elements to the user (signalling terminal). Message elements are extracted from the message store 7 in this manner both for transmission and for re-transmission.

In normal operation, a message remains in the message store 7 until a "handshake" control interconnection between the logic 1 and the user 5/6 results in the logic 1 taking the decision that the message whose control word is being scanned has been processed by the user specified. When this happens the message is functionally removed from the message store cell by the erasure of the message's control word, which releases the message cell for other use. Note that the message itself is not deleted since the storage media used are such that when a new message is inserted into a memory cell it over-writes (and thus in effect deletes) what is already in that cell. If the memory medium used is such that deletion is necessary before writing a new message in, then deletion of the message would be effected either in response to the deletion of the contents of the control store cell in use for that message or just before the insertion of a new message.

It is often desirable that messages of a particular priority can be selected for preferential treatment. In the present system this is catered for by the use of a message number of define the sequence in which messages are entered into the dynamic store. A message numbering range is supplied which is large and is adequate for the determination of the sequence of messages as required.

The messages may be entered into the message store from many sources each having its own message number generator, provided that all messages which enter a particular queue are referenced by the same message number generator. It is acceptable for a dynamic store to be used to enable one source to feed a group of users, and another source to feed a different group of users. This principle can be extended to cover as many groups of users and associated sources with their own message number generators as required.

In other applications than the multi-exchange network referred to, the message number may be inserted by the dynamic store logic when a message is accepted from one of a number of input ports.

In the telecommunication system application for which the data storage system has been described, a message should only spend a relatively short time in the dynamic store before being accessed and removed by the user (or one of the users). Hence a time out facility is provided whereby messages which have remained in the store beyond a designed limit are removed. This time out would normally operate as a result of a malfunction by one of the users or due to an overload: hence details of the time out can be routed to a maintenance position.

Because of the large number of messages which may be handled and assembled into queues by a single store, failure is undesirable, so the complete dynamic store is engineered using triplicated logic and majority voting techniques.

From the preceding description it will be appreciated that the status of the user port is significant to the operation: the status is transferred to the control logic 1 during the "handshake" control operation so that it is available for use as required, e.g. for controlling change-over from first choice user to second choice user.

In the system described herein, the data storage and message queueing techniques are used only for messages outgoing from the system processor to other distinct processors over common channel links. This is actually, in the telecommunication network for which the system was developed, part of a super-module unit which also serves to assemble and despatch incoming messages via a message assembler and a FIFO queue common to all 124 terminals. This in effect provides a separate channel for messages going the opposite way to those dealt with by the queueing technique referred to.

In one network using the system there is only one input port per storage system, i.e. the inputs 9,12,17 in the drawing are not present. However, another network has two input ports, and in those networks each signalling link user port has one input queue per priority level per source. Messages with a higher priority have precedence over those with a lower priority, but within the same priority level messages are alternately selected from each source of the same priority.

Systems using the present techniques may have two or more signalling links between a given pair of exchanges in addition to the speech circuits therebetween. In such a case if one of the links fails the messages are all sent via the other link or links.

What is claimed is:

1. A data storage system for use with a plurality of user circuits, said system comprising:

a plurality of ports associated with said plurality of user circuits for receiving and/or sending messages;

a message store having a plurality of groups of queues of message cells, each group of said plurality of groups of queues being associated with a corresponding one of said user ports, each of said message cells being adapted for storing one of said messages;

a control store having a plurality of control cells, each of said plurality of control cells being associated with a corresponding one of said message cells, each control cell being adapted to store control information relative to said corresponding message cell, said control information including information indicating whether said corresponding message cell contains message information and information identifying first and second choice user ports;

scanning means for sequentially scanning said plurality of control cells and reading said indicating information to identify busy and idle message cells;

polling means response to said scanning means identifying an idle message cell for identifying when one of said user circuits has a message to be stored;

control means responsive to said polling means identifying a user circuit having a message to be stored and said scanning means identifying an idle message cell for controlling the transfer of said message to be stored to an idle message cell and including means for amending the contents of the control cell associated with said idle message cell such that said identifying information indicates the user port for which said message cell is to be used and for changing said indicating information to indicate that said idle message cell contains message information;

said polling means being responsive to said scanning means identifying a busy message cell for addressing said first choice user port identified by said identifying information of the control cell corresponding to said identified busy message cell;

said control means including means for transferring the information in said identified busy message cell to said addressed first choice user port in response to said addressed first choice user port having a predetermined status and for modifying said control information stored in said control cell corresponding to said identified busy message cell; and said control means being responsive to said addressed first choice user port having a second predetermined status for transferring said information in said identified busy message cell to a different one of said groups of queues, said different one of said groups of queues corresponding to the second choice user port identified by said identifying information of said control cell corresponding to said identified busy message cell.

2. A data storage system in accordance with claim 1, wherein said control information includes a header portion of each received message identifying said first and second choice users and a priority indicating code, wherein each queue of each of said group of queues corresponds to a different priority, and wherein said control means includes means response to said priority indicating code of each received message for storing said received message in a corresponding queue.

3. A data storage system in accordance with claim 2, wherein messages stored in a queue are transmitted in chronological order of reception.

4. A data storage system in accordance with claim 3, wherein each said plurality of ports comprises a search register containing information defining a message to be received when that port is free to receive a message; and comparison means;

said control means being operable to transfer a portion of said control information from a control cell scanned by said scanning means, said portion containing information indicating a corresponding busy message cell to one of said first or second choice users identified by said identifying information;

said comparing means being operable to compare said search register information and said portion of said control information to determine whether said portion of said control word information corresponds to a higher priority message or an older message of the same priority as that identified in the search register and for modifying the contents of the search register.

5. A data storage system in accordance with claim 4, wherein when one of said ports is free to handle a message, said free user port sends a control signal to that message's control cell to remove the message from a said queue, but not to delete the message from the message cell, and to concurrently reset the search register to a rest condition wherein the search register can accept information for another message, and wherein the message removed from the queue is sent to said free port.

6. A data storage system in accordance with claim 5, wherein each said port transmits a signal to said control means when a message is received, said control means operating to delete the contents of that message's control cell in response to said signal whereby said message's control cell and the associated message cell are made available for use for a new message.

* * * * *